(12) United States Patent
Muto et al.

(10) Patent No.: US 8,566,558 B2
(45) Date of Patent: Oct. 22, 2013

(54) STORAGE APPARATUS AND DATA MANAGEMENT METHOD

(75) Inventors: Junichi Muto, Odawara (JP); Isamu Kurokawa, Odawara (JP); Ran Ogata, Odawara (JP); Kazue Jindo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 13/147,286

(22) PCT Filed: Jul. 22, 2011

(86) PCT No.: PCT/JP2011/004158
§ 371 (c)(1),
(2), (4) Date: Aug. 1, 2011

(87) PCT Pub. No.: WO2013/014701
PCT Pub. Date: Jan. 31, 2013

(65) Prior Publication Data
US 2013/0024643 A1 Jan. 24, 2013

(51) Int. Cl.
*G06F 12/00* (2006.01)
(52) U.S. Cl.
USPC .......................................... 711/171; 711/207
(58) Field of Classification Search
None
See application file for complete search history.

(56) References Cited

U.S. PATENT DOCUMENTS

| | | | |
|---|---|---|---|
| 5,193,184 A | | 3/1993 | Belsan et al. |
| 6,092,168 A | * | 7/2000 | Voigt ............................. 711/170 |
| 8,131,956 B2 | * | 3/2012 | Yamagami .................... 711/161 |
| 2006/0085471 A1 | | 4/2006 | Rajan et al. |
| 2008/0147961 A1 | * | 6/2008 | Seki et al. ...................... 711/100 |
| 2009/0187730 A1 | * | 7/2009 | Mori et al. ..................... 711/207 |
| 2011/0138119 A1 | * | 6/2011 | Yamagami .................... 711/112 |
| 2011/0138143 A1 | | 6/2011 | Seki et al. |

FOREIGN PATENT DOCUMENTS

EP 1 936 488 A2 6/2008
JP 2008-146574 A 6/2008

OTHER PUBLICATIONS

PCT International Search Report and Written Opinion on application PCT/JP2011/004158 mailed Apr. 17, 2012; 11 pages.

* cited by examiner

*Primary Examiner* — Charles Rones
*Assistant Examiner* — Tian-Pong Chang
(74) *Attorney, Agent, or Firm* — Foley & Lardner LLP

(57) ABSTRACT

To efficiently manage data including control information. A storage apparatus connected to a host requesting data writing includes one or a plurality of storage devices and a controller for allocating a storage area in page units to an area of a virtual volume to write the data in response to a request from the host to write the data wherein if the data regarding which the host makes the write request includes control information and data excluding the control information is specified data, the controller releases the allocation of the page allocated to the area for writing the relevant data.

10 Claims, 15 Drawing Sheets

FIG. 6

BITMAP INFORMATION

| BYTE | NAME | CONTENTS |
|---|---|---|
| 0 | HD#0/1 | •4 BITS/ALLOCATE HEAD |
| 1 | HD#2/3 | B0 : NON-STANDARD R0 |
| 2 | HD#4/5 | B1 : NO RECORD |
| 3 | HD#6/7 | B2 : DL1 FIXED-LENGTH RECORD |
| 4 | HD#8/9 | B3 : SAME DATA |
| 5 | HD#a/b | |
| 6 | HD#c/d | |
| 7 | HD#e/- | |
| 8 | DL1 | FIRST RECORD LENGTH IN ONE CYLINDER |
| 9 | | |
| 10 | DATA | STORE SAME DATA PATTERN |
| 11 | | |
| 12 | DL1HD# | HEAD NUMBER TO WHICH DL1 IS SET |
| 13 | SPARE | |
| 14 | LRC | CHECK CODE |
| 15 | 0 | ZERO FIXED |

| MAPPING TABLE | |
|---|---|
| VIRTUAL PAGE NO. | REAL PAGE NO. |
| VP# 0 | TRACK #0 |
| VP# 1 | Null |
| VP# 2 | TRACK #1 |

1162A  1162B  1162

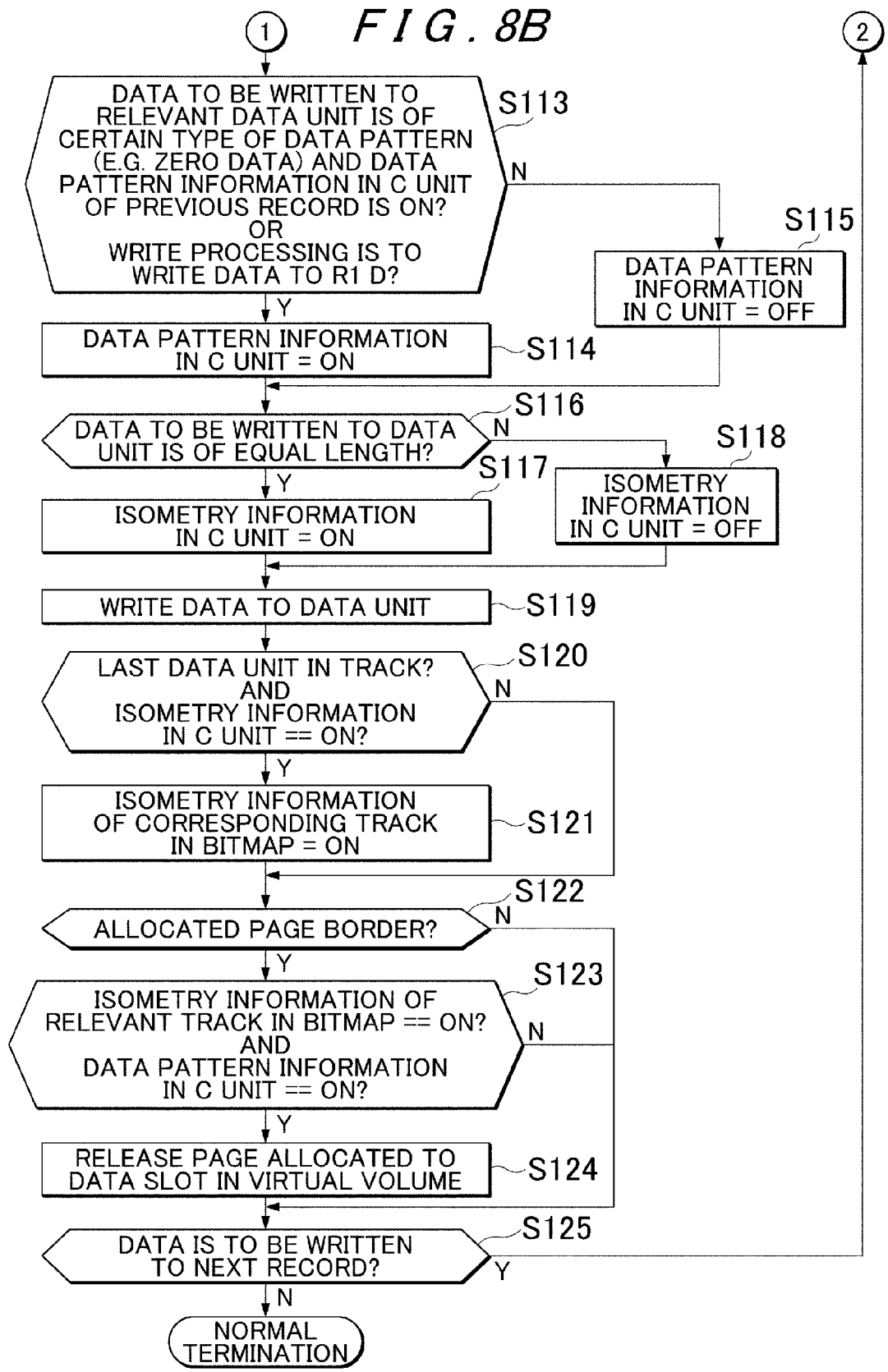

FIG. 10

| BYTE | NAME | CONTENTS |
|---|---|---|
| 0 | HD#0/1 | ·4 BITS/ALLOCATE HEAD |
| 1 | HD#2/3 | B0 : NON-STANDARD R0 |
| 2 | HD#4/5 | B1 : NO RECORD |
| 3 | HD#6/7 | B2 : DL1 FIXED-LENGTH RECORD |
| 4 | HD#8/9 | B3: SAME DATA |
| 5 | HD#a/b | |
| 6 | HD#c/d | |
| 7 | HD#e/- | |
| 8 | DL1 | FIRST RECORD LENGTH IN ONE CYLINDER |
| 9 | | |
| 10 | DATA | STORE SAME DATA PATTERN |
| 11 | | |
| 12 | DL1HD# | HEAD NUMBER TO WHICH DL1 IS SET |
| 13 | HD#0 C UNIT | RECORD NUMBER OF ISOMETRIC RECORD TO WHICH SAME DATA IS WRITTEN |
| 14 | HD#1 C UNIT | RECORD NUMBER OF ISOMETRIC RECORD TO WHICH SAME DATA IS WRITTEN |
| 15 | HD#2 C UNIT | RECORD NUMBER OF ISOMETRIC RECORD TO WHICH SAME DATA IS WRITTEN |
| 16 | HD#3 C UNIT | RECORD NUMBER OF ISOMETRIC RECORD TO WHICH SAME DATA IS WRITTEN |
| 17 | HD#4 C UNIT | RECORD NUMBER OF ISOMETRIC RECORD TO WHICH SAME DATA IS WRITTEN |
| 18 | HD#5 C UNIT | RECORD NUMBER OF ISOMETRIC RECORD TO WHICH SAME DATA IS WRITTEN |
| 19 | HD#6 C UNIT | RECORD NUMBER OF ISOMETRIC RECORD TO WHICH SAME DATA IS WRITTEN |
| 20 | HD#7 C UNIT | RECORD NUMBER OF ISOMETRIC RECORD TO WHICH SAME DATA IS WRITTEN |
| 21 | HD#8 C UNIT | RECORD NUMBER OF ISOMETRIC RECORD TO WHICH SAME DATA IS WRITTEN |
| 22 | HD#9 C UNIT | RECORD NUMBER OF ISOMETRIC RECORD TO WHICH SAME DATA IS WRITTEN |
| 23 | HD#10 C UNIT | RECORD NUMBER OF ISOMETRIC RECORD TO WHICH SAME DATA IS WRITTEN |
| 24 | HD#11 C UNIT | RECORD NUMBER OF ISOMETRIC RECORD TO WHICH SAME DATA IS WRITTEN |
| 25 | HD#12 C UNIT | RECORD NUMBER OF ISOMETRIC RECORD TO WHICH SAME DATA IS WRITTEN |
| 26 | HD#13 C UNIT | RECORD NUMBER OF ISOMETRIC RECORD TO WHICH SAME DATA IS WRITTEN |
| 27 | HD#14 C UNIT | RECORD NUMBER OF ISOMETRIC RECORD TO WHICH SAME DATA IS WRITTEN |
| 28 | SPARE | |
| 29 | SPARE | |
| 30 | LRC | CHECK CODE |
| 31 | 0 | ZERO FIXED |

1161A 1161B 1161C

1161

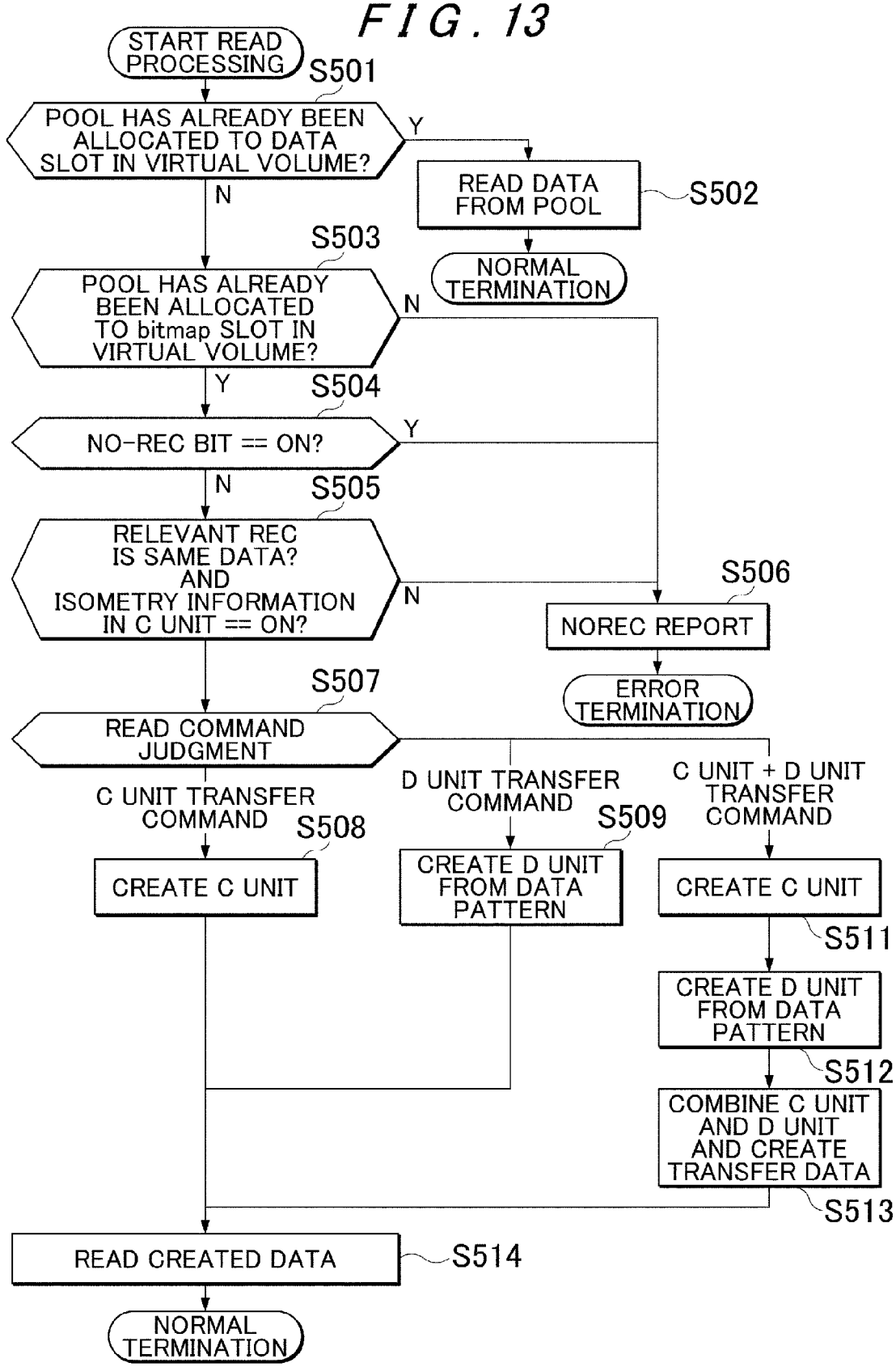

STORAGE APPARATUS AND DATA MANAGEMENT METHOD

TECHNICAL FIELD

The present invention relates to a storage apparatus and a data management method and is suited for use in a storage apparatus and data management method for providing storage areas to a mainframe host computer.

BACKGROUND ART

Recently, a virtualization function called Thin Provisioning has been drawing attention as one of functions installed in a storage apparatus. The thin provisioning function is a function providing a virtual logical volume (hereinafter referred to as a virtual volume) to a host computer and dynamically allocating a storage area to the virtual volume if a data write request is made from the host computer to the virtual volume. Such a thin provisioning function has advantages that make it possible to provide a virtual volume of a larger capacity than the capacity of a storage area, which can be actually provided, to the host computer, reduce a physical storage capacity in the storage apparatus which must be prepared in advance, and construct a computer system at a low cost.

Furthermore, when the above-described thin provisioning function is utilized and the host computer deletes data, if only management information of the relevant data is deleted without deleting the actual data, there are problems, that is, the storage apparatus cannot recognize a storage area where unnecessary data is stored, and the storage area allocated to the virtual volume once cannot be released. Therefore, Patent Literature 1 discloses a technology of allowing the storage apparatus to recognize a storage area, where the unnecessary data is stored, and releasing the relevant storage area even if the data management information is deleted without deleting the actual data.

CITATION LIST

Patent Literature

PTL 1: Japanese Patent Application Laid-Open (Kokai) Publication No. H2008-146574

SUMMARY OF INVENTION

Technical Problem

Meanwhile, for example, financial institutions use mainframe host computers in order to conduct their business by using a large amount of data. If a data write request is made from a mainframe host computer to the above-mentioned virtual volume, it is necessary to manage the relevant data by dividing it into, for example, a count unit and a data unit. Specifically speaking, if the mainframe host computer makes a format write request to the virtual volume, a data set constituted from a count unit indicating control information and a data unit indicating the actual data is stored in a physical storage area allocated to the virtual volume. When performing format writing, invalid data (e.g. zero data) is stored in the data unit. Control information is stored as is in the count unit even if no valid data is written to the storage area for which format writing has been executed. As explained above, if all the data stored in the storage area allocated to the data set is invalid data, the problem is that the relevant storage area cannot be released.

The present invention was devised in consideration of the above-described circumstances and aims at suggesting a storage apparatus and data management method capable of efficiently managing data including control information.

Solution to Problem

In order to solve such problems, a storage apparatus that is connected to a host requesting data writing and includes one or more storage devices and a controller for allocating a storage area in page units to an area of a virtual volume to write the data in response to a request from the host to write the data is provided according to the present invention, wherein if the data, regarding which the host makes the write request includes control information, and the data excluding the control information is specified data, the controller releases the allocation of the page allocated to the area for writing the relevant data.

When such a configuration is used, if the host makes a request to write data including control information to the virtual volume and the write target data is specified data, allocation of the page which is allocated to the data write area is released. As a result, it becomes possible to efficiently release the storage area allocated to the virtual volume and effectively utilize resources in the storage apparatus.

Advantageous Effects of Invention

According to the present invention, it is possible to manage data including control information efficiently and effectively utilize the resources in the storage apparatus.

BRIEF DESCRIPTION OF DRAWINGS

FIG. 6 is a diagram showing an example of bitmap information according to the embodiment.

FIG. 7 is a diagram showing an example of a mapping table according to the embodiment.

FIG. 8B is a flowchart showing a processing procedure of the first format write processing according to the embodiment.

FIG. 10 is a diagram showing an example of bitmap information according to the embodiment.

FIG. 13 is a flowchart showing a processing procedure of read processing according to the embodiment.

DESCRIPTION OF EMBODIMENTS

Figure 1:
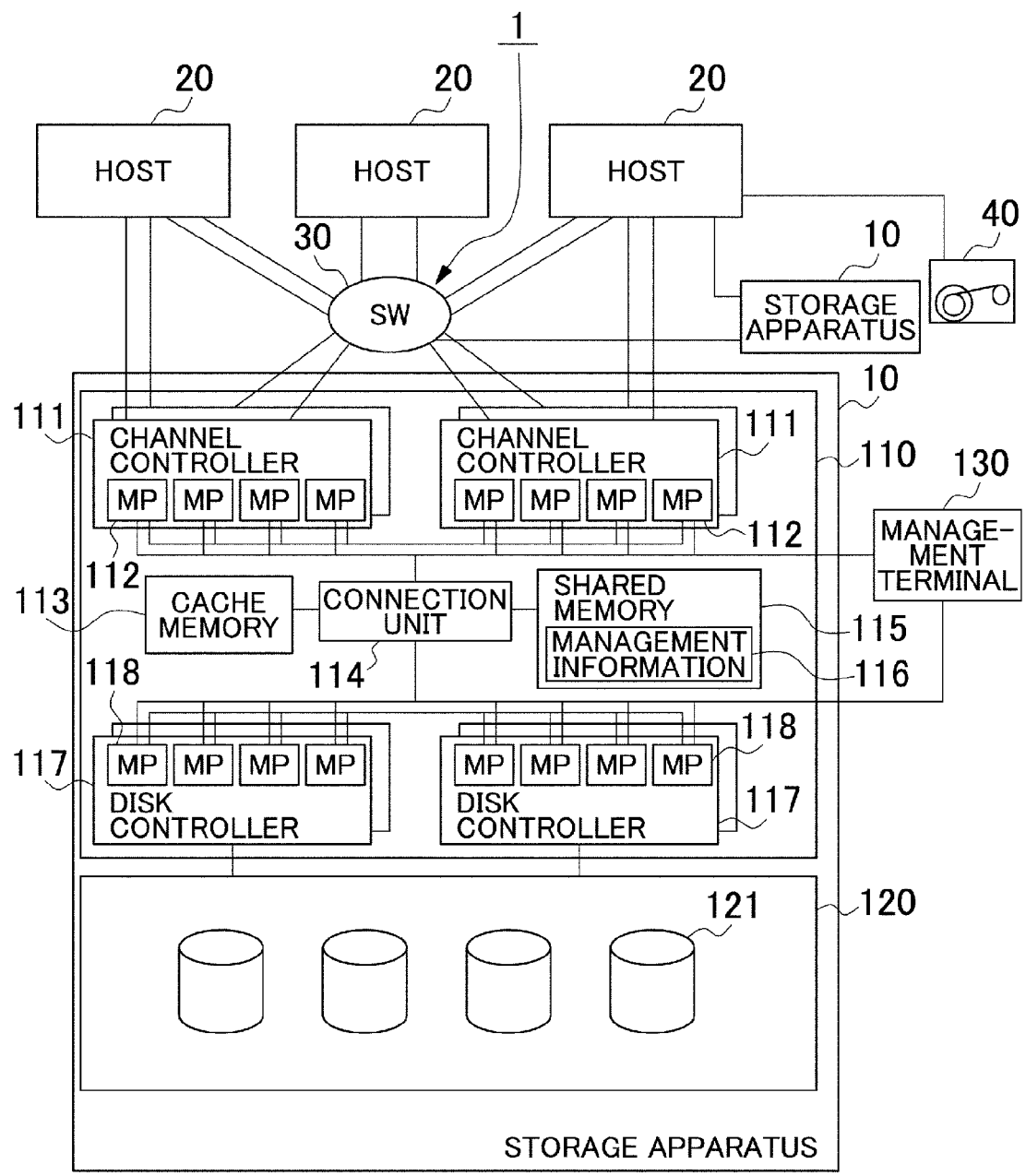
FIG. 1 is a block diagram showing an overall configuration of a computer system related to an embodiment of the present invention.

An embodiment of the present invention will be explained in detail with reference to the attached drawings.

(1) Overview of Present Embodiment

Firstly, the overview of this embodiment will be explained. Recently, a virtualization function called Thin Provisioning has been drawing attention as one of functions installed in a storage apparatus. The thin provisioning function is a function providing a virtual logical volume (hereinafter referred to as a virtual volume) to a host computer and dynamically allocating a storage area to the virtual volume if a data write request is made from the host computer to the virtual volume. Specifically speaking, when receiving a data write request from the host computer to the virtual volume, the storage apparatus allocates a required amount of storage area in units of specified size called "pages" from an actual volume (pool volume) to a specified area of a virtual volume specified by the write request, and writes the write target data to the allocated pages.

Furthermore, when the above-mentioned thin provisioning function is utilized and the host computer deletes data, if only management information of the data is deleted without deleting the actual data, the problem is that the storage apparatus cannot recognize a storage area where unnecessary data is stored, and that the storage area allocated to the virtual volume once cannot be released. Therefore, a technology of allowing the storage apparatus to recognize the storage area where the unnecessary data is stored, and releasing the relevant storage area even if the management information of the data is deleted without deleting the actual data, is disclosed.

Meanwhile, for example, financial institutions use mainframe host computers in order to conduct their business by using a large amount of data. If a mainframe host computer makes a data write request to the above-mentioned virtual volume, it is necessary to manage the relevant data by dividing it into, for example, a count unit and a data unit. Specifically speaking, if the mainframe host computer makes a format write request to the virtual volume, a data set composed of a count unit indicating control information and a data unit indicating the actual data is stored in a physical storage area (page) allocated to the virtual volume. Invalid data (e.g. zero data) is stored in the data unit at the time of format writing. Control information is stored as is in the count unit even if no valid data is written to the storage area for which format writing was executed. Accordingly, all the data stored in the page allocated to the virtual volume is not invalid data, so that the problem is that the relevant storage area cannot be released.

Therefore, this embodiment is designed so that even if the data of the count unit is not of the same pattern in the data set stored in the page allocated to the virtual volume, if the data unit is a specified data (e.g. zero data), the allocation of the relevant storage area to the virtual volume is released. Furthermore, the page whose allocation to the virtual volume is released can be newly allocated to a virtual volume. As a result, if a request is made to write data including control information to the virtual volume, it is possible to efficiently release the page allocated to the relevant virtual volume and effectively utilize the resources in the storage apparatus.

(2) Configuration of Computer System

Next, the configuration of a computer system 1 according to the present embodiment will be explained. Referring to FIG. 1, the computer system 1 includes a storage apparatus 10, a host 20, a switch (described as an SW in the drawing) 30, a tape management device 40, and a management terminal 130.

The storage apparatus 10 is constituted from a storage control unit 110 and a storage unit 120 and is connected to the host 20 via the switch 30. Furthermore, the storage apparatus 10 executes data processing in accordance with requests from the host 20.

The storage control unit 110 is, for example, a disk array device. The storage control unit 110 provides storage resources, which the storage unit 120 has, to the host 20. Furthermore, the storage control unit 110 includes a plurality of channel controllers 111, a plurality of disk controllers 117, a cache memory 113, a connection unit 114, and a shared memory 115.

Each of the channel controllers 111 is composed of a plurality of microprocessors 112 (described as MPs in the drawing) and performs data communication with the host 20 under control of the relevant microprocessors 112. Specifically speaking, the channel controller 111 interprets and executes various commands received from the host 20. Unique addresses are allocated to the channel controllers 111; and if a plurality of hosts 20 exist, each of the channel controllers 111 can accept requests from each of the hosts 20 individually.

Each of the disk controllers 117 is composed of a plurality of microprocessors 118 (described as MPs in the drawing) and performs data communication with a storage device 121 in the storage unit 120 under control of the relevant microprocessors 118. The disk controller 117 writes data, which the channel controller 111 received from the host 20, to a specified area in the storage device 121 based on a write command from the host 20 and also reads the data from the specified area in the storage device 121 based on a read command from the host 20 and transmits the data to the host 20.

The cache memory 113 is a storage area for temporarily storing data received from the host 20 and data read from the storage device 121. Furthermore, the shared memory 115 stores, for example, management information 116 required for system management. Examples of the management information 116 stored in the shared memory include HA/R0 information 1160, bitmap information 1161, a mapping table 1162, and a data management program 1163.

The connection unit 114 mutually connects the channel controllers 111, the disk controllers 117, the management terminal 130, the cache memory 113, and the shared memory 115. The connection unit 114 can be configured as a high-speed bus such as an ultrafast crossbar switch which performs data transmission by a high-speed switching operation.

The storage unit 120 includes a plurality of storage devices 121. The storage devices 121 are composed of a plurality of hard disk drives (HDDs: Hard Disk Drives) which are expensive hard disk drives such as SSD (Solid State Disk) and SCSI (Small Computer System Interface) disks or inexpensive hard disk drives such as SATA (Serial AT Attachment) disks.

The host 20 is a computer device equipped with information processing resources such as a CPU (Central Processing Unit) and a memory. The host 20 will be explained by taking a mainframe host as an example in this embodiment; however, the type of the host is not limited to such an example, and the host may be, for example, a personal computer or a workstation. The CPU functions as an operation processing unit and controls the operation of the host 20 in accordance with, for example, programs and operation parameters stored in the memory. Furthermore, the host 20 includes information input devices such as a keyboard, a switch, a pointing device, and a microphone and information output devices such as a monitor display and a speaker.

In a case of the mainframe host 20, data received from the host 20 can be divided into one or a plurality of slots. The data received from the host 20 and divided by a specified number of blocks is called slots. Furthermore, in the case of the mainframe host, a mainframe's unique management unit called a track exists and one track is, for example, 56 kilobytes. In this embodiment, the slot size corresponds with the track size. Furthermore, the mainframe host 20 issues a command by specifying a track number.

The switch 30 is a physical switch connecting the storage apparatus 10 and the host 20 and performs data communication by connecting ports (not shown in the drawing) which are respectively installed in the storage apparatus 10 and the host 20. The tape management device 40 is a device for managing, for example, data writing to, or data reading from, tape storage media and similar and backs up data stored, for example, in the storage units 120 of the storage apparatus 10 in accordance with requests from the host 20.

The management terminal 130 is a computer device for maintaining or managing the storage control unit 110 and is composed of, for example, a personal computer or a workstation. Furthermore, the management terminal 130 includes information processing resources such as a CPU and a memory. The CPU functions as an operation processing unit and controls the operation of the management terminal 130 in accordance with, for example, programs and operation parameters stored in the memory. Furthermore, the management terminal 130 includes information input devices such as a keyboard, a switch, a pointing device, and a microphone and information output devices such as a monitor display and a speaker; and an operator can, for example, install additional storage devices 121 and removal the storage devices 121, and change the configuration of the storage devices 121 by operating the management terminal 130.

(3) Data Configuration of Storage Apparatus

Figure 2:
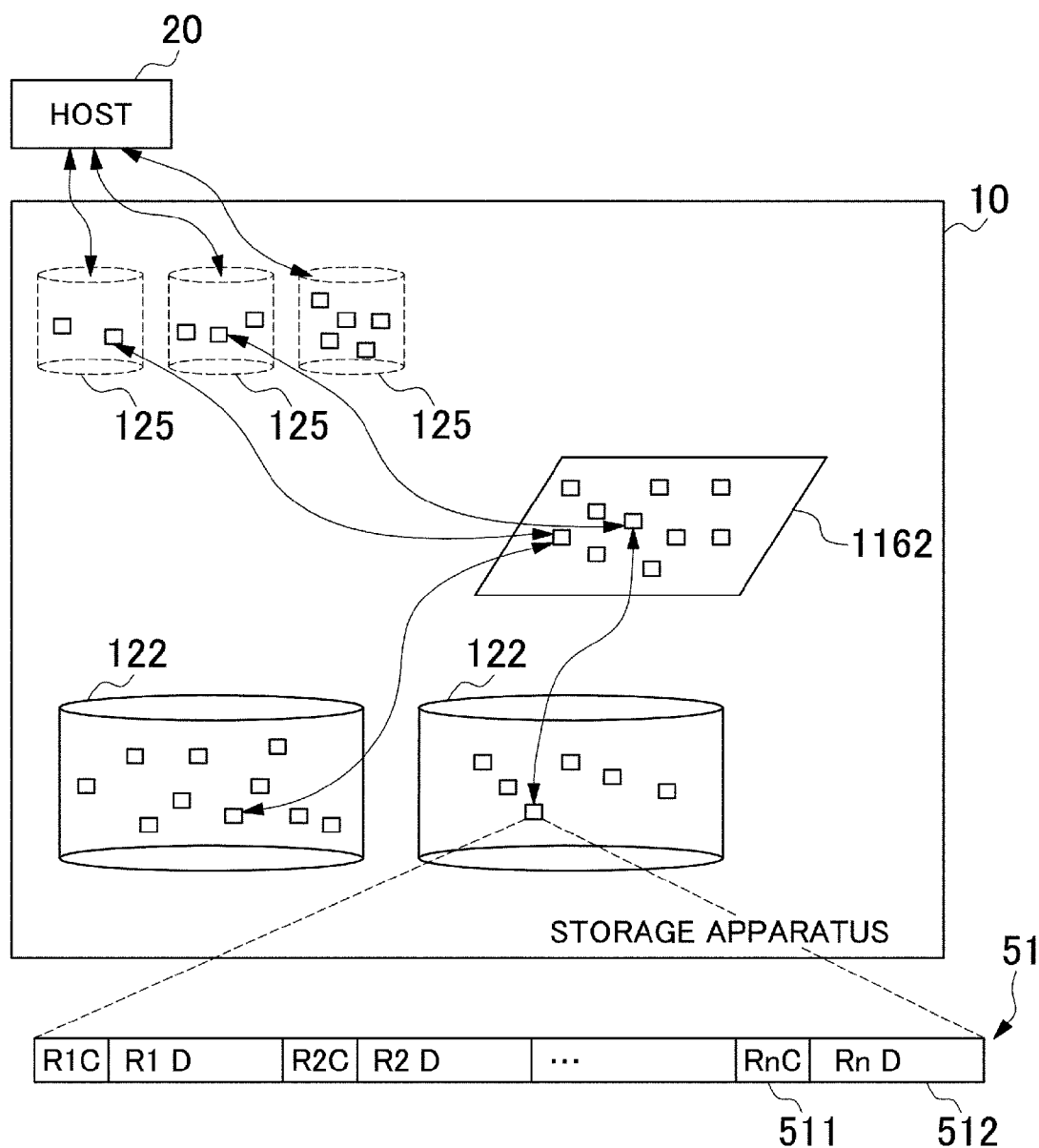
FIG. 2 is a conceptual diagram explaining page allocation according to the embodiment.

Next, page allocation in the storage apparatus 10 will be explained. Referring to FIG. 2, the storage apparatus 10 provides virtual volumes 125 to the host 20 by the thin provisioning function. When receiving a data write request from the host 20 to a virtual volume 125, the storage apparatus 10 allocates a required amount of storage area from a pool volume 122 in units of a specified size called "pages" to an area, which is specified by the write request, of the virtual volume 125 specified by the relevant write request and writes the write target data to the allocated pages. The storage apparatus 10 manages which page is allocated to which virtual volume 125, by using the mapping table 1162 of the shared memory 115.

In the case of the mainframe host 20, data in the pool volume 122 is managed in units called tracks 51 and the host 20 issues a command by specifying a track number as explained above. Furthermore, each track includes a plurality of records and each record is configured as a data set including a counter unit (RnC) 511 and a data unit (RnD) 512.

The pool volume 122 is composed of cylinders equipped with a large number of tracks. Each track stores, for example, the control information of each cylinder, control information of each track, and the above-mentioned data sets. Data stored in each track and divided by a specified number of blocks is called slots. For example, the control information of each track will be referred to as an HAR0 slot, the control information of each cylinder will be referred to as a bitmap slot, and a plurality of data sets of each track will be referred to as a data slot.

If format writing is requested from the mainframe host 20, the storage apparatus 10 stores the control information such as a segment number, a key length, and a data length in the counter unit (RnC) 511 of a track specified by the relevant request, stores data indicating a specified value such as zero data in the data unit (RnD) 512, and formats the relevant track. Even if the counter units (RnC) 511 are not the specified value such as zero data with respect to a plurality of data sets in a track, if the data units (RnD) 512 of all the data sets are the specified value, the pages allocated to the relevant track are released in this embodiment.

In response to a data write request from the host 20 to the virtual volume 125, the storage apparatus 10 allocates pages in units of the above-mentioned slots. A data area of one slot and a data area of one page are recognized as the same unit and one page is allocated to one slot in this embodiment; however, the invention is not limited to such an example and a data area of a plurality of slots may be recognized as the same unit as the data area of one page and one page may be allocated to a plurality of slots.

Figure 3:
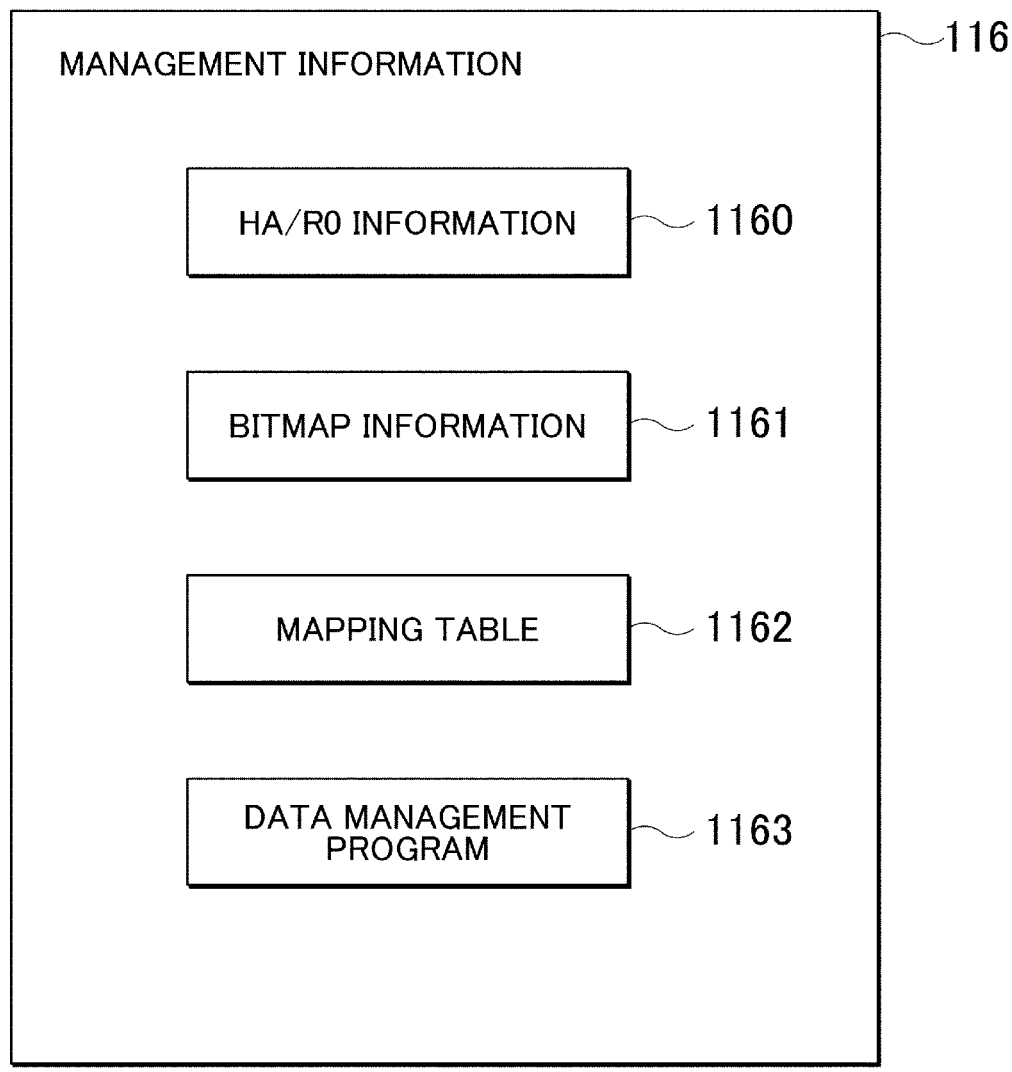
FIG. 3 is a block diagram showing the contents of management information according to the embodiment.

Next, the contents of the management information 116 stored in the shared memory 115 will be explained. Referring to FIG. 3, the management information 116 is constituted from, for example, HA/R0 information 1160, bitmap information 1161, a mapping table 1162, and a data management program 1163.

Figure 4:
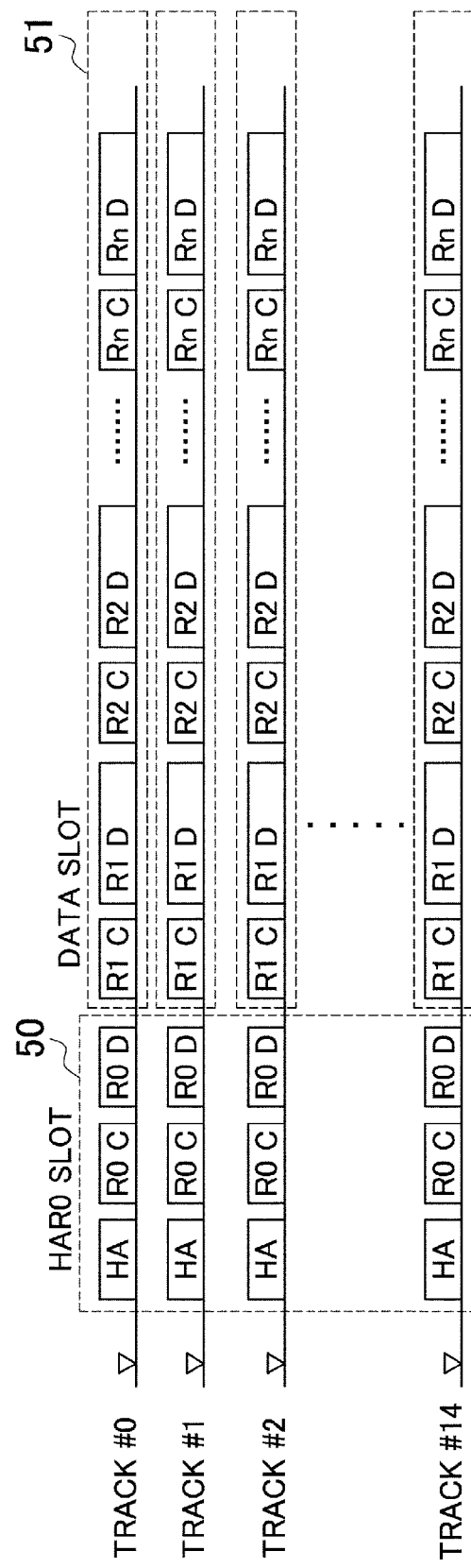
FIG. 4 is a conceptual diagram showing a track format according to the embodiment.

The HA/R0 information 1160 is the control information of each cylinder. Specifically speaking, the HA/R0 information 1160 stores information of a home address (HA) of each cylinder and a top record of the cylinder (R0). The HA/R0 information 1160 is composed of, for example, an 8-byte HA and a 24-byte R0. The HA stores, for example, a physical address (PA), cylinder number (CC), and track number (HH) of each cylinder; and the R0 stores a physical address (PA), cylinder number (CC), track number (HH), and record number (R) of the first record. Now, as shown in FIG. 4 regarding the track format of the mainframe volume, each of the tracks is configured to include a home address (HA) of the cylinder and a plurality of data sets. The data sets include counter units (R0C, R01C, R2C and so on up to RnC) and data units (R0D, R1D, R2D and so on up to RnD).

Furthermore, among the data sets, the data sets indicating the top record (R0C, R0D) are managed as HAR0 information with the home address, and the data sets other than the data sets indicating the top record are managed as data information. Furthermore, records including the HA/R0 information of tracks from #0 to #15, which constitute one cylinder, are managed collectively as an HAR0 slot 50, and the R0 and subsequent data sets in the tracks from #0 to #15 are collectively managed as data slots 51. As explained above, pages are allocated from the pool volume 122 in units of these slots.

Figure 5:
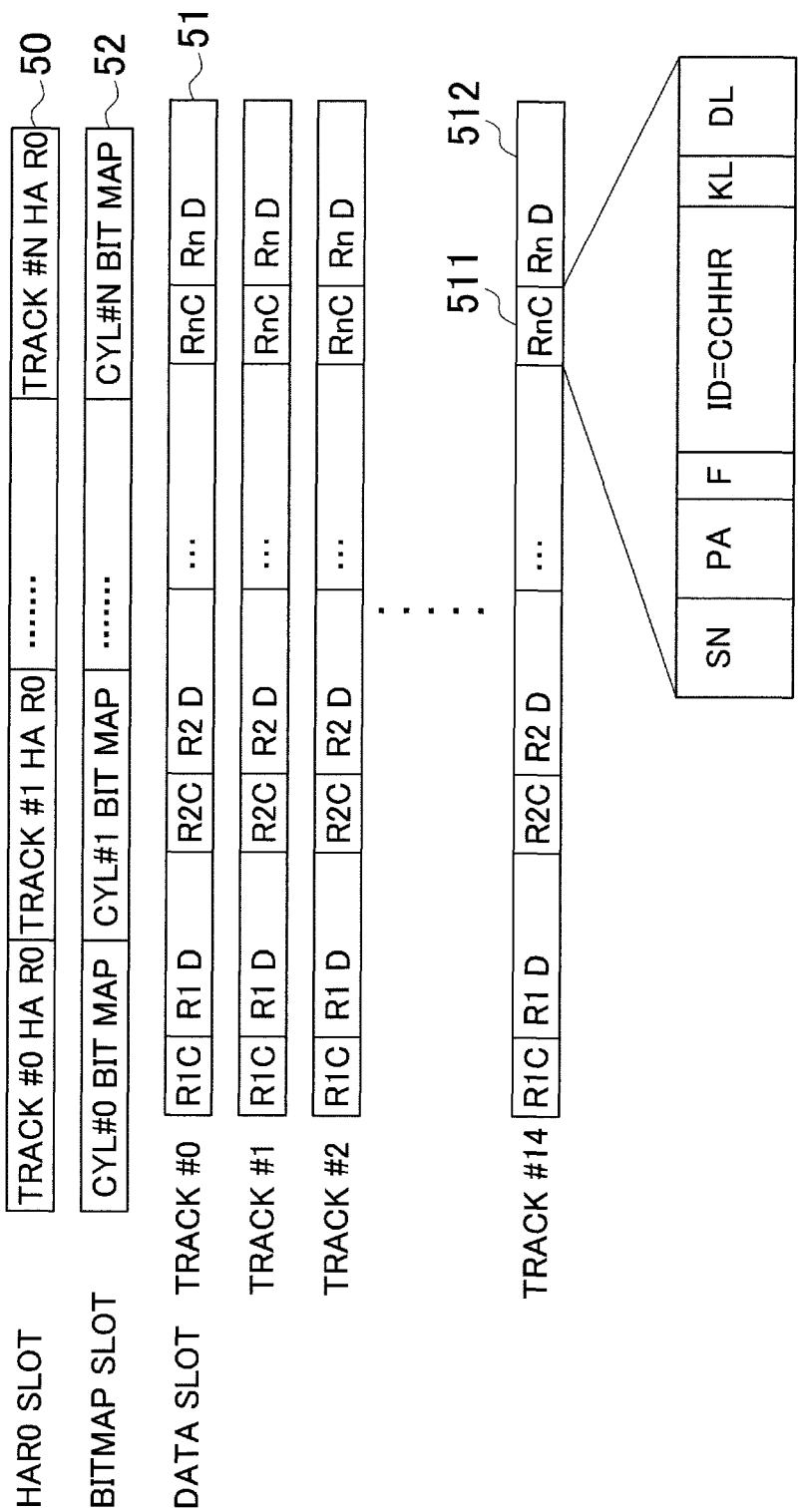
FIG. 5 is a conceptual diagram showing the track format according to the embodiment.

Furthermore, as shown in FIG. 5, in addition to the above-mentioned HAR0 slot 50 and data slots 51, a bitmap slot 52 which stores the bitmap information of each cylinder is stored in the virtual volume 125. Pages are also allocated to the bitmap slot 52 from the pool volume 122.

Furthermore, the counter unit (RnC) 511 indicating the control information of the data in the data slot 51 is constituted from a segment number (SN), a physical address (PA), isometry information (F), actual address information (ID=CCHHR), a KL (key length), and a DL (data length) of the relevant data set. The segment number (SN) is the number of a segment to which each data belongs, and the physical address (PA) is a physical address where each data is stored. The isometry information (F) is information indicating whether the data in the track is of an equal length or not. Furthermore, the isometry information (F) may be specified in two bytes, a flag indicating the isometry information of the data may be set to one byte, and a flag indicating whether the data is of the same pattern or not may be set for one byte. The actual address information (ID=CCHHR) is information indicating a cylinder number (CC), a track number (HH), and a record number (R) of a storage area where the relevant data is stored. The KL (key length) is information indicating the length of a key of the data. The DL (data length) is information indicating the length of the data.

The bitmap information 1161 is information such as a record length and a data pattern which are common to the data sets in a cylinder, and one piece of bitmap information 1161 is set to each cylinder. The bitmap information 1161 is constituted from a byte field 1161A, a name field 1161B, and a contents field 1161C as shown in FIG. 6. A byte number of the bitmap is stored in the byte field 1161A. The name of each byte is stored in the name field 1161B. The contents indicated by a plurality of bits of each byte are stored in the contents field 1161C.

In case of FIG. 6, 0-th and 7-th bytes of the bitmap information 1161 stores information which is common to the tracks from 0 to 15 and flags of four bits from b0 to b3 are set. For example, the b0 bit is a flag indicating whether each record is a standard record or a non-standard record; the b1 bit is a flag indicating whether a record exists in each track or not; the b2 bit is a flag indicating whether a record in the track is of a fixed length or not; and the b3 bit is a flag indicating whether the data in the track is the same data or not. If format write is requested from the host 20, the flags from b1 to b3 are turned off once.

Furthermore, 8-th and 9-th bytes 8 and 9 of the bitmap information 1161 store a record length of the tracks in the cylinder. Specifically speaking, the record length of the first record in one cylinder is stored. The information indicating which record is specified as the first record is stored in a 12-th byte in the bitmap information 1161. Furthermore, 10-th and 11-th bytes of the bitmap information 1161 store the same data pattern specified in the cylinder. For example, if the same data pattern is specified as zero and zero is stored in the data unit (RnD) 512, the relevant data is treated as invalid data.

Next, the mapping table 1162 will be explained. The mapping table 1162 is a table for managing the correspondence relationship between a specified area of the virtual volume 125 and a specified area of the pool volume 122 which is a real volume. As shown in FIG. 7, the mapping table 1162 is constituted from a virtual page number field 1162A and a real page number field 1162B. A virtual page number of the virtual volume 125 is stored in the virtual page number field 1162A. A real page number of the pool volume 122 is stored in the real page number field 1162B. Since the data area of one slot and the data area of one page are set as the same unit in this embodiment as explained above, a data area corresponding to one slot of the virtual volume 125 is managed by a virtual page number and a data area corresponding to one slot of the pool volume 122 is managed by an real page number. In a case of FIG. 7, it is indicated that a page of the pool volume 122 indicated by the real page number "track #0" is allocated to a page of the virtual volume indicated by the virtual page number "VP #0".

The data management program 1163 is a program for, when a data write request is made from the host 20 to the virtual volume 125, allocating a real page of the pool volume 122 to a virtual page specified by the relevant request and writing data to the relevant real page. Furthermore, if format writing is requested from the mainframe host 20 to the virtual volume 125, the program executes the format processing on a track specified by the relevant request. Furthermore, if data stored in the page allocated to the virtual volume 125 is invalid data, the program executes processing for releasing the relevant page allocated to the virtual volume 125. The format write processing, the data update write processing, the page release processing, and the data read processing executed by the data management program 1163 will be explained later in detail.

(4) Data Management Method for Storage Apparatus

Next, processing procedures of various types of processing regarding the data management method according to this embodiment will be explained. Incidentally, reference will be made to the data management program 1163 as the subject of the various processing in the following explanation; however, it is a matter of course that the MP (microprocessor) 112 for the channel controller 111 and the MP (microprocessor) 118 for the disk controller 117 in the storage apparatus 10 actually execute[the processing in accordance with the data management program 1163.

(4-1) Format Write Processing

Next, the format write processing executed by the data management program 1163 of the storage apparatus 10 will be explained. The format write processing is executed in response to a format write request from the host 20. Two types of processing described below can be indicated as examples of the format write processing in this embodiment.

The first format write processing is executed in such a manner that at the time of the format write processing, the program allocates a page of the pool volume 122 to a specified area in the virtual volume 125 and checks whether the relevant data is specified data or not while writing the data to the relevant page. Then, after writing all the data in one entire page, that is, one slot, and if all the written data is a specified data, the program releases the allocation of the page of the pool volume 122 allocated to one slot in the virtual volume 125.

The second format write processing is executed in such a manner that at the time of the format write processing, the program checks whether the write target data is specified data or not, without allocating a page of the pool volume 122 to the virtual volume 125. Then, if only the write target is not specified data, the program allocates a page of the pool volume 122 to the specified area in the virtual volume 125.

Figure 8A:
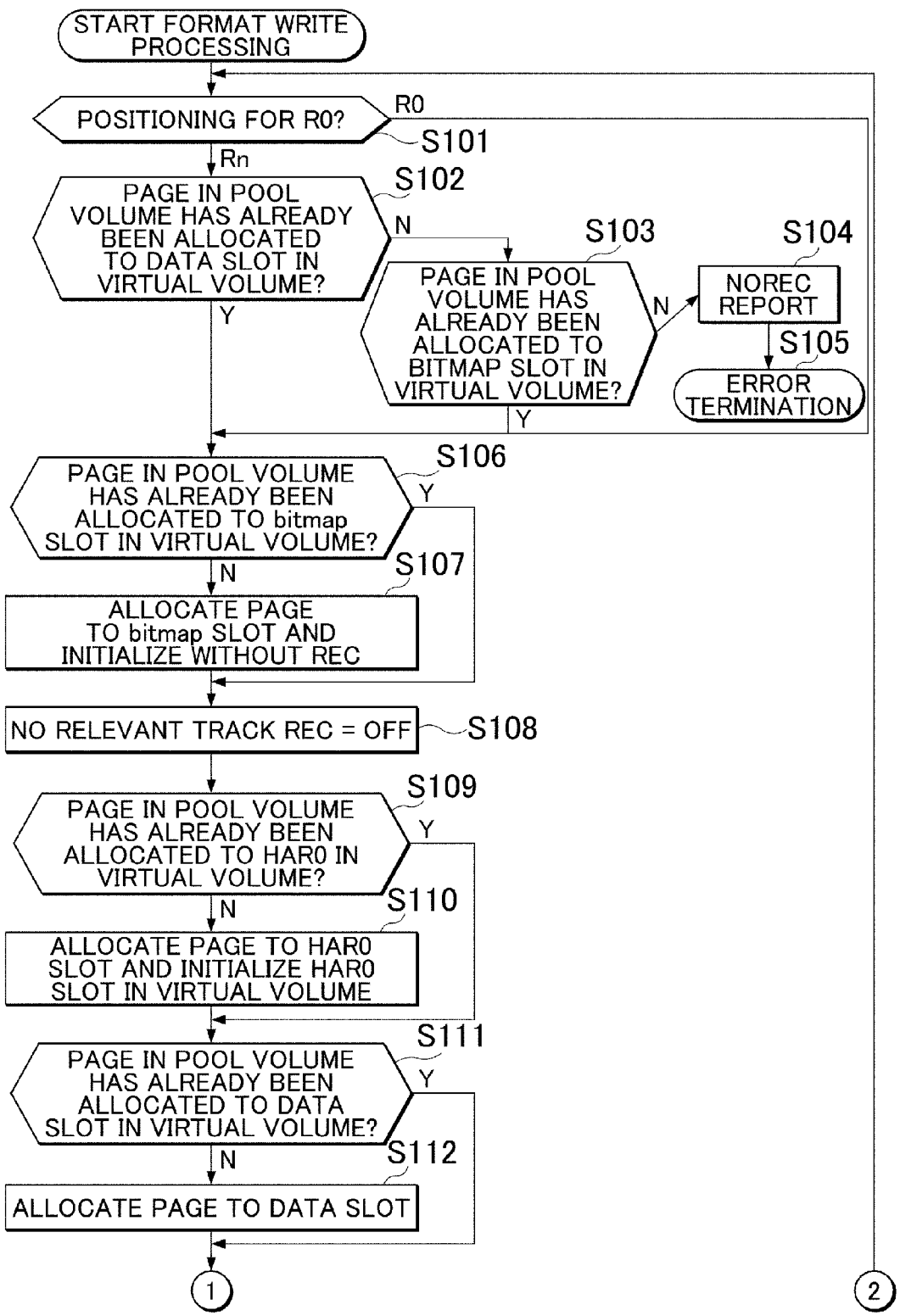
FIG. 8A is a flowchart showing a processing procedure of first format write processing according to the embodiment.

Firstly, the first format write processing will be explained with reference to FIG. 8A and FIG. 8B. As shown in FIG. 8A, if format writing is requested from the host 20 to the virtual volume 125, the data management program 1163 judges whether to perform positioning for the top record (R0) or not (S101). Specifically speaking, the data management program 1163 judges whether data specified by the format write request is the top record (R0) of a formatting target track or not; and if the data is the top record (R0), the program specifies the format write target as the top record (R0).

In case of writing data in response to the format write request from the mainframe host 20, the program positions the data in a record immediately before the specified record and writes the target data based on information of a count unit of a data set of the previous record. Therefore, in case of formatting all pieces of data in one slot, the program positions the data in the top record (R0), which is immediately before the first record (R1), and then formats the first and subsequent records sequentially. Furthermore, if another record (Rn) than the first record is designated as the formatting target, the program positions the data in a record (Rn−1) immediately before that record.

If it is determined in step S101 that positioning in the top record (R0) should be performed, the data management program 1163 proceeds to processing in step S106 and subsequent steps.

On the other hand, if it is determined in step S101 that positioning in the top record (R0) should not be performed, the data management program 1163 judges whether a page in the pool volume 122 has already been allocated to the data slot in the virtual volume 125 or not (S102). If it is determined in step S102 that a page in the pool volume 122 has already been allocated to the data slot in the virtual volume 125, the data management program 1163 executes processing in step S106 and subsequent steps.

Meanwhile, if it is determined in step S102 that no page in the pool volume 122 is allocated to the data slot in the virtual volume 125, the data management program 1163 judges whether a page in the pool volume 122 has already been allocated to the bitmap slot 52 in the virtual volume 125 or not (S103).

If it is determined in step S103 that a page in the pool volume 122 has already been allocated to the bitmap slot 52 in the virtual volume 125, the data management program 1163 executes the processing in step S106 and subsequent steps. On the other hand, if it is determined in step S103 that no page in the pool volume 122 is allocated to the bitmap slot 52 in the virtual volume 125, the data management program 1163 transmits an NOREC report indicating that no target record exists, to the host 20 (S104) and terminates the processing with an error (S105).

Subsequently, the data management program 1163 judges whether a page in the pool volume 122 has already been allocated to the bitmap slot 52 in the virtual volume 125 or not (S106). If positioning in the top record (R0) is performed in step S106, the status is that no page in the pool volume 122 has been allocated to the specified area in the virtual volume 125 yet.

If it is determined in step S106 that a page in the pool volume 122 has already been allocated to the bitmap slot 52 in the virtual volume 125, the data management program 1163 executes processing in step S108 and subsequent steps. On the other hand, if it is determined in step S106 that no page in the pool volume 122 is allocated to the bitmap slot 52 in the virtual volume 125, the data management program 1163 allocates a page in the pool volume 122 to the bitmap slot 52 and initializes the slot (S107). Specifically speaking, the data management program 1163 turns OFF the no-record flag of the bit b1 in the 0-th to 7-th bytes in the bitmap information 1161.

On the other hand, if it is determined in step S106 that a page in the pool volume 122 has already been allocated to the bitmap slot 52 in the virtual volume 125, that is, if positioning for a record other than the top record (R0) is performed, the data management program 1163 turns OFF the no-record flag of the track specified by the format write request (S108). Specifically speaking, the data management program 1163 turns OFF the no-record flag of the bit b1 of the relevant track in the 0-th to 7-th bytes in the bitmap information 1161.

Subsequently, the data management program 1163 judges whether a page in the pool volume 122 has already been allocated to the HAR0 slot in the virtual volume 125 or not (S109). If it is determined in step S109 that a page in the pool volume 122 has already been allocated to the HAR0 slot in the virtual volume 125, the data management program 1163 executes processing in step S111 and subsequent steps.

On the other hand, if it is determined in step S109 that no page in the pool volume 122 is allocated to the HAR0 slot in the virtual volume 125, the data management program 1163 allocates a page to the HAR0 slot in the virtual volume 125 and initializes the HAR0 slot (S110).

Subsequently, the data management program 1163 judges whether a page in the pool volume 122 has already been allocated to the data slot 51 in the virtual volume 125 or not (S111). If it is determined in step S111 that a page in the pool volume 122 has already been allocated to the data slot 51 in the virtual volume 125, the data management program 1163 executes the processing in step S133 and subsequent steps.

On the other hand, if it is determined in step S111 that no page in the pool volume 122 is allocated to the data slot 51 in the virtual volume 125, the data management program 1163 allocates a page in the pool volume 122 to the data slot 51 (S112).

Subsequently, the data management program 1163 judges whether the data to be written to the data unit (RnD) 512 is of a specified data pattern (e.g. zero data) and data pattern information in the count unit (RnC) 511 of a record immediately before the target record is ON or whether the write processing is write processing for on data unit (R1D) in the first record (R1) in the data slot 51 (S113). At this point, the data pattern information in the count unit (RnC) 511 of the data set is set to the data pattern information in the isometry information (F) in the counter unit (RnC) 511. The data pattern information in the isometry information (F) in the counter unit (RnC) 511 is information indicating whether the relevant record is of the same data pattern as the previous record or not. Therefore, the case where the data pattern information of the previous record is ON indicates that the previous record and all preceding records are of the same data pattern.

Then, if it is determined in step S113 that the data to be written to the data unit (RnD) 512 is, for example, zero data and that the data pattern information in the count unit (RnC) 511 of the previous record is ON, the data management program 1163 turns ON the data pattern information in the count unit (RnC) 511 (S114). Furthermore, the data management program 1163 also turns ON the data pattern information in the count unit (RnC) 511 in a case of the write processing on the data unit (R1D) in the first record (R1) in the data slot 51. On the other hand, if a negative judgment is returned in step S113, the data management program 1163 turns OFF the data pattern information in the count unit (RnC) (S115).

Subsequently, the data management program 1163 judges whether the data to be written to the data unit (RnD) 512 is of an equal length or not (S116). Specifically speaking, the data management program 1163 judges whether the isometry information of the count unit (RnC) 511 of the record immediately before the write target record is ON and the data length of the previous record is equal to the data length of the write target record or not.

If it is determined in step S116 that the data to be written to the data unit (RnD) 512 is of an equal length, the data management program 1163 turns ON the isometry information in the count unit (RnC) (S117). On the other hand, if it is determined in step S116 that the data to be written to the data unit (RnD) 512 is not of an equal length, the data management program 1163 turns OFF the isometry information in the count unit (RnC) (S118).

Then, the data management program 1163 writes the data to the write target data unit (RnD) 512 (S119).

Subsequently, the data management program 1163 judges whether the write target data unit (RnD) 512 in step S119 is the last data unit in the track and, at the same time, the isometry information in the count unit (RnC) is ON or not (S120). In step S120, the case where the write target data unit (RnD) 512 is the last data unit in the track and the isometry information in the count unit (RnC) is ON means a case where all pieces of the data in the track are of an equal length.

If an affirmative judgment is returned in step S121, the data management program 1163 turns ON the isometry information of the corresponding track in the bitmap information 1161 (S121). Specifically speaking, the data management program 1163 turns ON the same-data flag of the bit b3 of the relevant track from the 0-th byte to the 7-th byte in the bitmap information 11610. On the other hand, if a negative judgment is returned in step S121, the data management program 1163 proceeds to processing in step S122 and subsequent steps.

Then, the data management program 1163 judges whether the end of the data slot is the border (end) of the page of the pool volume 122 allocated to the virtual volume 125 or not (S122). If an affirmative judgment is returned in step S122, the data management program 1163 judges whether the isometry information (the same-data flag of the bit b3) of the target track in the bitmap information 1161 is ON and the data pattern information in the count unit (RnC) 511 is ON or not (S123). On the other hand, if a negative judgment is returned in step S122, the data management program 1163 proceeds to processing in step S125 and subsequent steps.

If an affirmative judgment is returned in step S123, the data management program 1163 releases the page of the pool volume 122 allocated to the data slot 51 in the virtual volume 125 (S124). In step S124, releasing the page of the pool volume 122 means cancelling the allocation of the page of the pool volume 122 to the virtual volume 125. On the other hand, if a negative judgment is returned in step S123, the data management program 1163 proceeds to the processing in step S125 and subsequent steps.

The data management program 1163 judges whether any data is written to the next record or not (S125). If no data is written, the data management program 1163 terminates the processing; and if any data is written, the data management program 1163 repeats the processing in step S101 and subsequent steps.

Accordingly, in the above-mentioned first format write processing, whether the write target data is specified data or not and whether the write target data and the data which has already been written to the track are of an equal length or not are checked, and whether all pieces of the data in the track are specified data and of an equal length is finally checked in, for example, steps S113 and S116. Then, if all pieces of the data in the track are specified data and of an equal length, the program releases the page in the pool volume 122 allocated to the virtual volume 125 in step S124. As a result, even if the counter unit (RnC) 511 of the data set is not specified data, the page allocation can be released if the data unit (RnD) 512 is specified data; and, therefore, the resources in the storage apparatus 10 can be effectively utilized without recording invalid data which is not accessed by the host 20 in the pool volume 122.

Figure 9A:
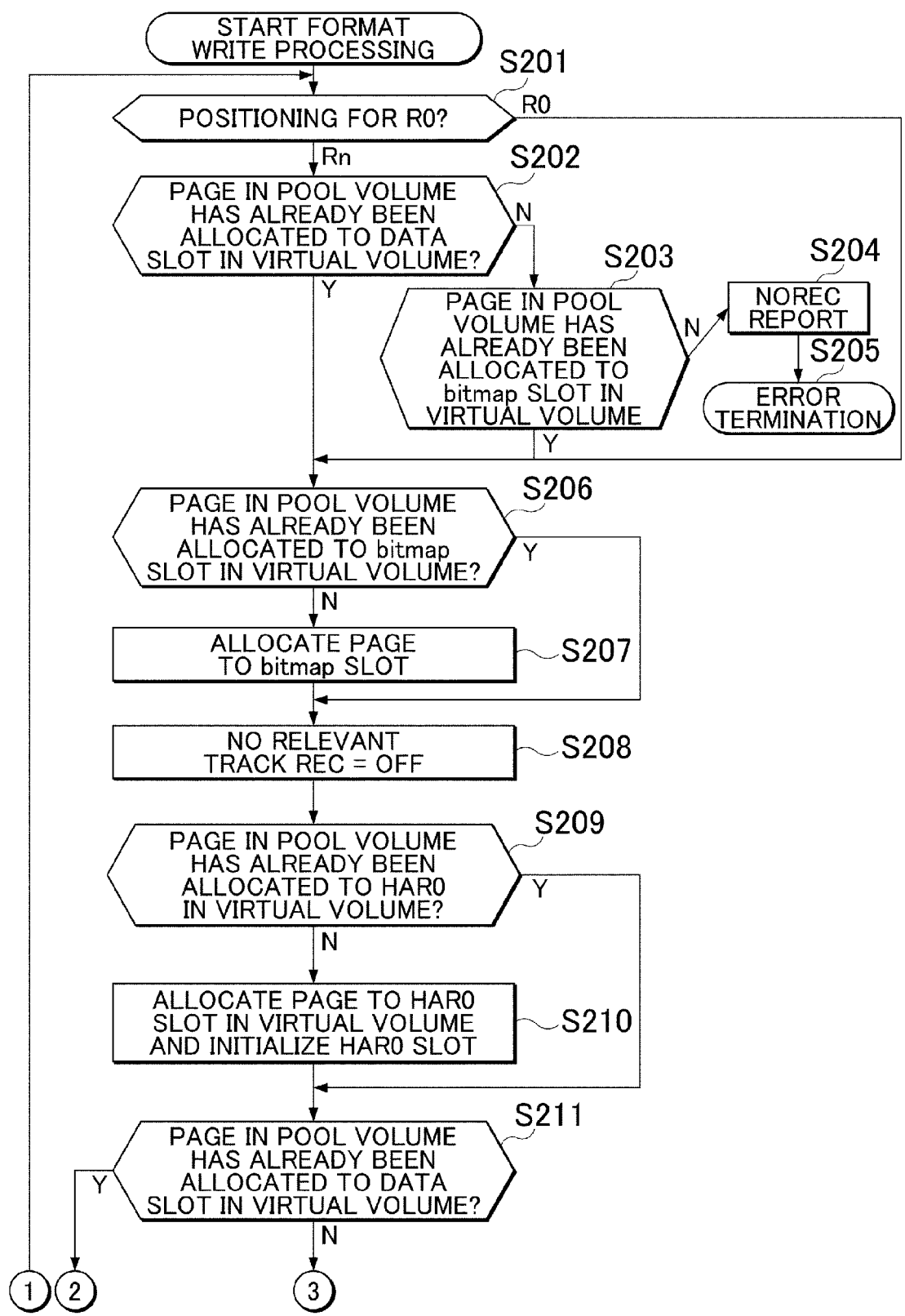
FIG. 9A is a flowchart showing a processing procedure of second format write processing according to the embodiment.
Figure 9B:
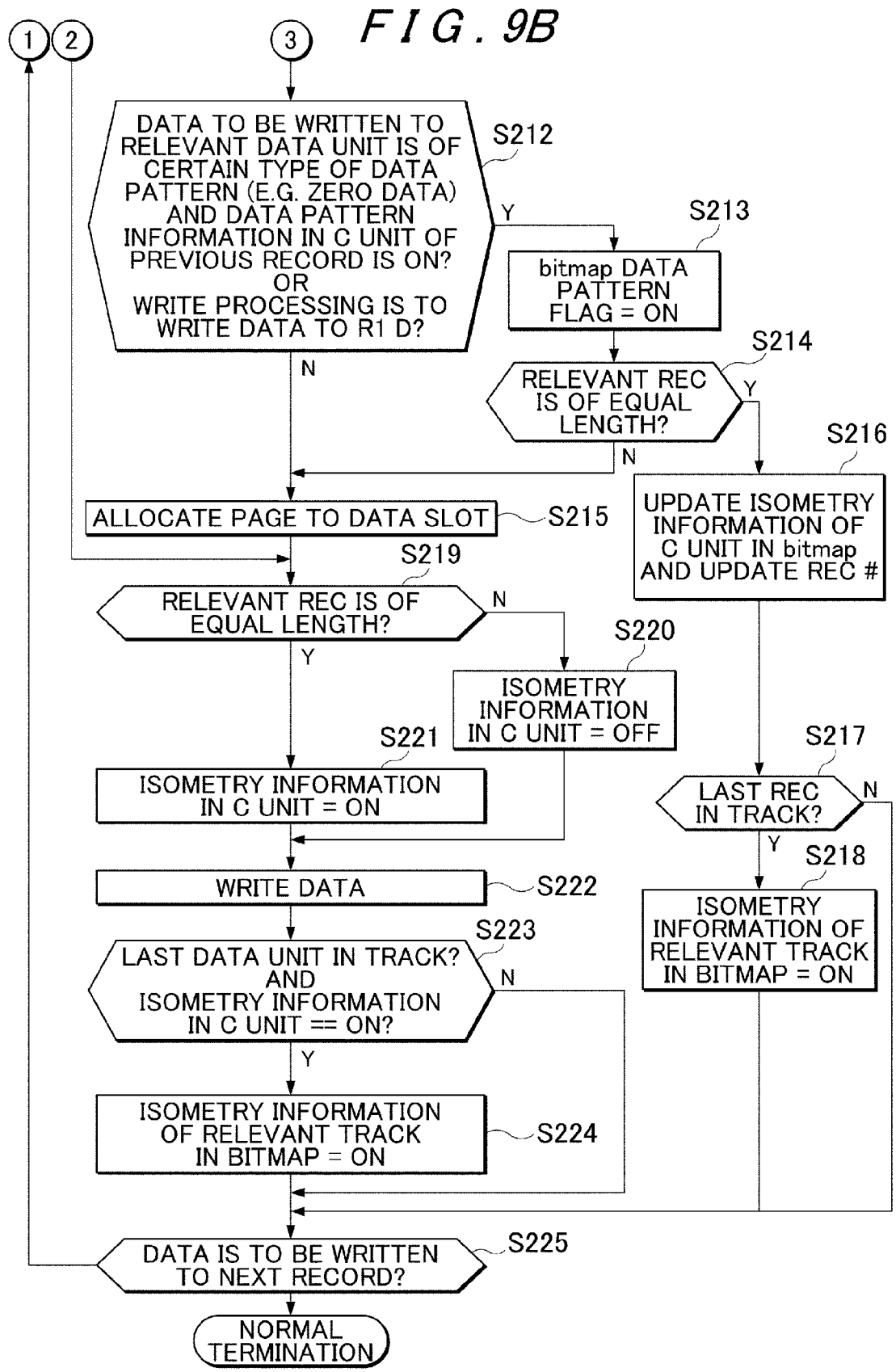
FIG. 9B is a flowchart showing a processing procedure of the second format write processing according to the embodiment.

Next, the second format write processing will be explained with reference to FIG. 9A and FIG. 9B. Any detailed explanation of the same processing as the first format write processing has been omitted and processing which is different from the first format write processing will be explained particularly in detail. As explained above, in the second format write processing, whether the write target data is specified data or not is checked without allocating a page of the pool volume 122 to the virtual volume 125. In order to realize this check processing, a flag having information instead of the isometry information (F) of the counter unit (RnC) 511 is newly set in the bitmap information 1161.

As shown in FIG. 10, fifteen bytes from the 13-th byte to the 27-th byte of the bitmap information 1161 utilized for the second format write processing stores, in addition to the bitmap information 1161 shown in FIG. 6, information indicating whether data in each track is of an equal length and of the same data pattern or not. For example, instead of the isometry information (F) of the counter unit (RnC) 511 of the track number 0 (HD #0), the record number of a record of an equal length where the same data is recorded among the records in the track is set to the byte 13 of the bitmap information 1161. Therefore, the data management program 1163 can determine, based on from the record numbers of the relevant track recorded in the bitmap information, from the head to which record of the records in the track is the data of an equal length and of the same data pattern.

Returning to FIG. 9A, the explanation of the second format write processing is continued. If format writing is requested from the host 20 to the virtual volume 125, the data management program 1163 judges whether to perform positioning for the top record (R0) or not (S201).

If it is determined that positioning for the top record (R0) is to be performed in step S201, the data management program 1163 proceeds to the processing in step S206 and subsequent steps.

On the other hand, if it is determined in step S201 that positioning for the top record (R0) is not to be performed, the data management program 1163 judges whether a page in the pool volume 122 has already been allocated to the data slot in the virtual volume 125 or not (S202). If it is determined in step S202 that a page in the pool volume 122 has already been allocated to the data slot in the virtual volume 125, the data management program 1163 proceeds to the processing in step S106 and subsequent steps.

On the other hand, if it is determined in step S202 that no page in the pool volume 122 is allocated to the data slot in the virtual volume 125, the data management program 1163 judges whether a page in the pool volume 122 has already been allocated to the bitmap slot 52 in the virtual volume 125 or not (S203).

If it is determined in step S203 that a page in the pool volume 122 has already been allocated to the bitmap slot 52 in the virtual volume 125, the data management program 1163 proceeds to the processing in step S206 and subsequent steps. On the other hand, if it is determined in step S203 that no page in the pool volume 122 is allocated to the bitmap slot 52 in the virtual volume 125, the data management program 1163 transmits an NOREC report indicating that no target record exists, to the host 20 (S204) and terminates the processing with an error (S205).

Subsequently, the data management program 1163 judges whether a page in the pool volume 122 has already been allocated to the bitmap slot 52 in the virtual volume 125 or not (S206).

If it is determined in step S206 that a page in the pool volume 122 has already been allocated to the bitmap slot 52 in the virtual volume 125, the data management program 1163 proceeds to the processing in step S208 and subsequent steps. On the other hand, if it is determined in step S206 that no page in the pool volume 122 is allocated to the bitmap slot 52 in the virtual volume 125, the data management program 1163 allocates a page in the pool volume 122 to the bitmap slot 52 (S207).

On the other hand, if it is determined in step S206 that a page in the pool volume 122 has already been allocated to the bitmap slot 52 in the virtual volume 125, that is, if positioning for another record than the top record (R0) is performed, the data management program 1163 turns OFF the no-record flag of the track specified by the format write request (S208).

Subsequently, the data management program 1163 judges whether a page in the pool volume 122 has already been allocated to the HAR0 slot in the virtual volume 125 or not (S209). If it is determined in step S209 that a page in the pool volume 122 has already been allocated to the HAR0 slot in the virtual volume 125, the data management program 1163 executes processing in step S211 and subsequent steps.

On the other hand, if it is determined in step S209 that no page in the pool volume 122 is allocated to the HAR0 slot in the virtual volume 125, the data management program 1163 allocates a page to the HAR0 slot in the virtual volume 125 and initializes the HAR0 slot (S210).

Then, the data management program 1163 judges whether a page in the pool volume 122 has already been allocated to the data slot 51 in the virtual volume 125 or not (S211). If it is determined in step S211 that a page in the pool volume 122 has already been allocated to the data slot 51 in the virtual volume 125, the data management program 1163 executes processing in step S219 and subsequent steps.

On the other hand, if it is determined in step S211 that no page in the pool volume is allocated to the data slot 51 in the virtual volume 125, the program judges whether the data to be written to the data unit (RnD) 512 is of a specified data pattern (e.g. zero data) and the data pattern information in the counter unit (RnC) 511 of the previous record is ON or whether the write processing is write processing on the data unit (R1D) in the first record (R1) in the data slot 51 (S212).

Then, if it is determined in step S212 that the data to be written to the data unit (RnD) 512 is, for example, zero data and that the data pattern information in the count unit (RnC) 511 of the previous record is ON, the data management program 1163 turns ON the data pattern flag in the bitmap information 1161 (S213). Specifically speaking, the data management program 1163 turns ON the same-data flag of the bit b3 of the relevant track in the bitmap information 1161 shown in FIG. 10.

Subsequently, the data management program 1163 judges whether the write target record is of an equal length or not (S214). Specifically speaking, the data management program 1163 judges whether the isometry information of the count unit (RnC) 511 of the previous record is ON and the data length of the previous record is equal to the data length of the write target record or not.

If it is determined in step S214 that the data to be written to the data unit (RnD) 512 is of an equal length, the data management program 1163 updates the isometry information of the count unit (from the 13-th byte to the 27-th byte, the HD #n C unit) of the relevant track in the bitmap information 1161 and writes the record number of the write target record (S216). Next, the data management program 1163 judges whether the relevant record is the last record in the track or not (S217); and if the record is the last record, the data management program 1163 turns ON the isometry information of the corresponding track in the bitmap information 1161 (S218). On the other hand, if it is determined in step S217 that the relevant record is not the last record in the track, the data management program 1163 proceeds to processing in step S225.

On the other hand, if it is determined in step S116 that the data to be written to the data unit (RnD) 512 is not of an equal length, the data management program 1163 allocates a page in the pool volume 122 to the data slot 51 (S215).

Then, while a page in the pool volume has already been allocated to the data slot 51 in the virtual volume 125 in step S211, the data management program 1163 judges whether the write target record is of an equal length or not (S219). If it is determined in step S219 that the write target record is of an equal length, the data management program 1163 turns ON the isometry information in the counter unit (RnC) 511 (S221). On the other hand, if it is determined in step S219 that the write target record is not of an equal length, the data management program 1163 turns OFF the isometry information in the counter unit (RnC) 511 (S220).

Then, the data management program 1163 writes the data to the write target data unit (RnD) 512 (S222).

Subsequently, the data management program 1163 judges whether or not the write target data unit (RnD) 512 in step S222 is the last data unit in the track and the isometry information of the count unit (RnC) 511 is ON (S223).

If an affirmative judgment is returned in step S223, the data management program 1163 turns ON the isometry information of the corresponding track in the bitmap information 1161 (S224). Specifically speaking, the data management program 1163 turns ON the same-data flag of the bit b3 of the relevant track from the 0-th byte to the 7-th byte in the bitmap information 11610. On the other hand, if a negative judgment is returned in step S223, the data management program 1163 proceeds to processing in step S225 and subsequent steps.

The data management program 1163 judges whether any data is written to the next record or not (S225). If no data is written, the data management program 1163 terminates the processing; and if any data is written, the data management program 1163 repeats the processing in step S201 and subsequent steps.

Accordingly, in the above-mentioned second format write processing, whether or not the write target data is specified data and the write target data is of an equal length in the track is checked in steps S212, S214, and S219. Then, only if the write target data is not of an equal length and is not specified data, the program allocates a page in the pool volume 122 to the virtual volume 125. As a result, it is possible to record only valid data, which is accessed by the host 20, in the pool volume 122 and effectively utilize the resources in the storage apparatus 10.

(4-2) Update Write Processing

Next, the update write processing executed by the data management program 1163 in the storage apparatus 10 will be explained. The update write processing is executed in response to update write requests from the host 20.

Figure 11:
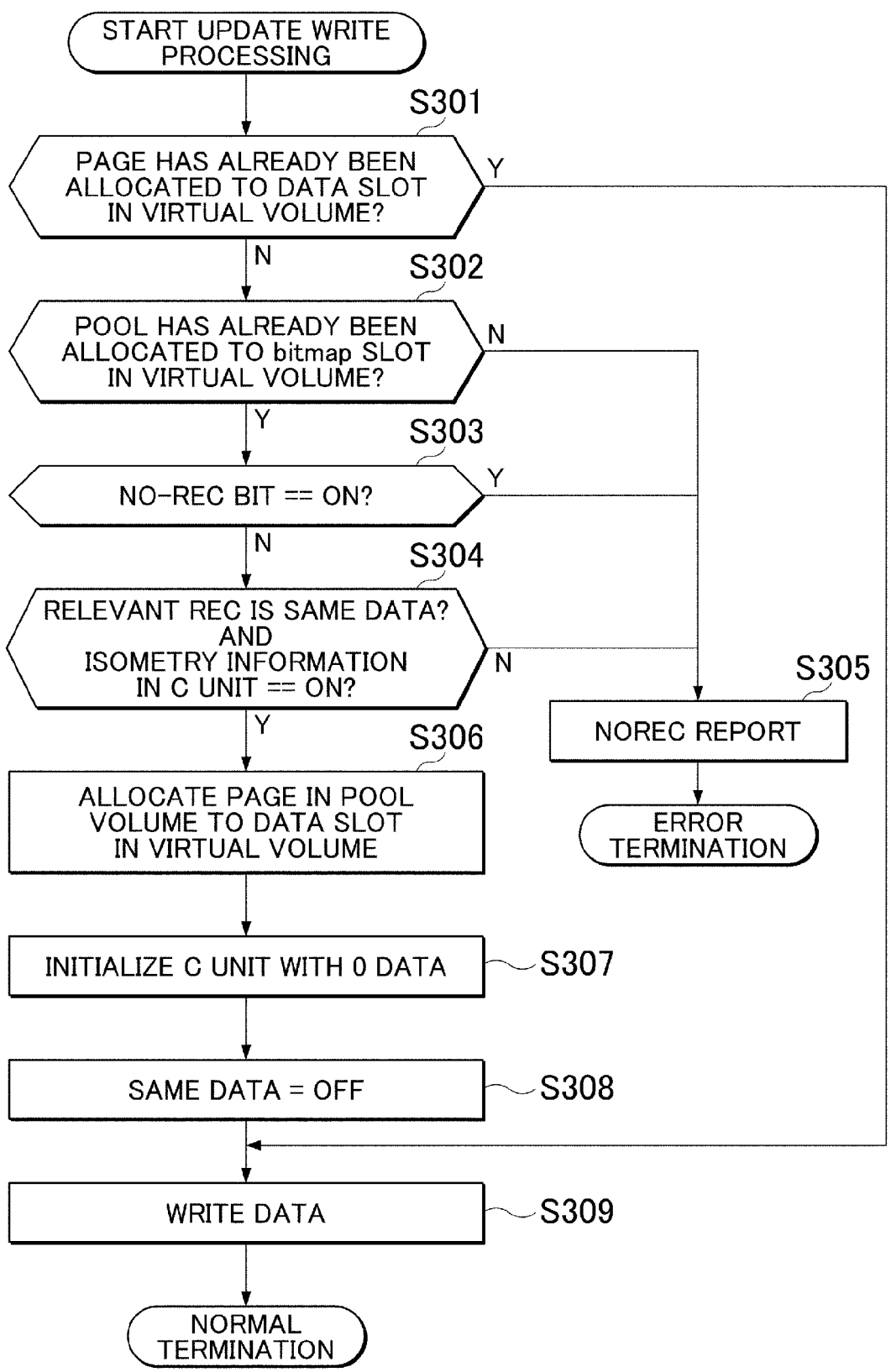
FIG. 11 is a flowchart showing a processing procedure of update write processing according to the embodiment.

As shown in FIG. 11, the data management program 1163 firstly judges whether a page in the pool volume 122 has already been allocated to the data slot in the virtual volume 125 or not (S301).

If it is determined in step S301 that a page in the pool volume 122 is allocated to the data slot in the virtual volume 125, the data management program 1163 writes the write target data to the allocated page (S309) and terminates the processing.

On the other hand, if it is determined in step S301 that no page in the pool volume 122 is allocated to the data slot in the virtual volume 125, the data management program 1163 judges whether a page in the pool volume 122 has already been allocated to the bitmap slot 52 in the virtual volume 125 or not (S302). If it is determined in step S302 that no page is allocated to the bitmap slot 52 in the virtual volume 125, the data management program 1163 transmits an NOREC report to the host 20 (S305) and terminates the processing with an error.

Next, if it is determined in step S302 that a page is allocated to the bitmap slot 52 in the virtual volume 125, the data management program 1163 judges whether the no-record bit (the bit b1) in the bitmap information 1161 is ON or not (S303). If it is determined in step S303 that the no-record bit is ON, the data management program 1163 transmits an NOREC report to the host 20 (S305) and terminates the processing with an error.

If it is determined in step S303 that the no-record bit is not ON, the data management program 1163 judges whether or not the same-data bit (the bit b3) in the bitmap information 1161 is ON and the isometry information in the count unit (RnC) is ON (S304). If a negative judgment is returned in step S304, the data management program 1163 transmits an NOREC report to the host 20 (S305) and terminates the processing with an error.

If an affirmative judgment is returned in step S304, the data management program 1163 allocates a page in the pool volume 122 to the data slot 51 in the virtual volume 125 (S306). Then, the data management program 1163 initializes the counter unit (RnC) 511 with specified data and initializes the data unit (RnD) 512 with zero data (S307). Subsequently, the data management program 1163 turns OFF the same-data bit (the bit b3) in the bitmap information 1161 (S308), writes the write target data to the page in the pool volume 122 allocated in step S306 (S309), and terminates the processing.

(4-3) Page Release Processing

Next, the page release processing executed by the data management program 1163 in the storage apparatus 10 will be explained. The page release processing is the processing executed regularly in a specified cycle.

Figure 12:
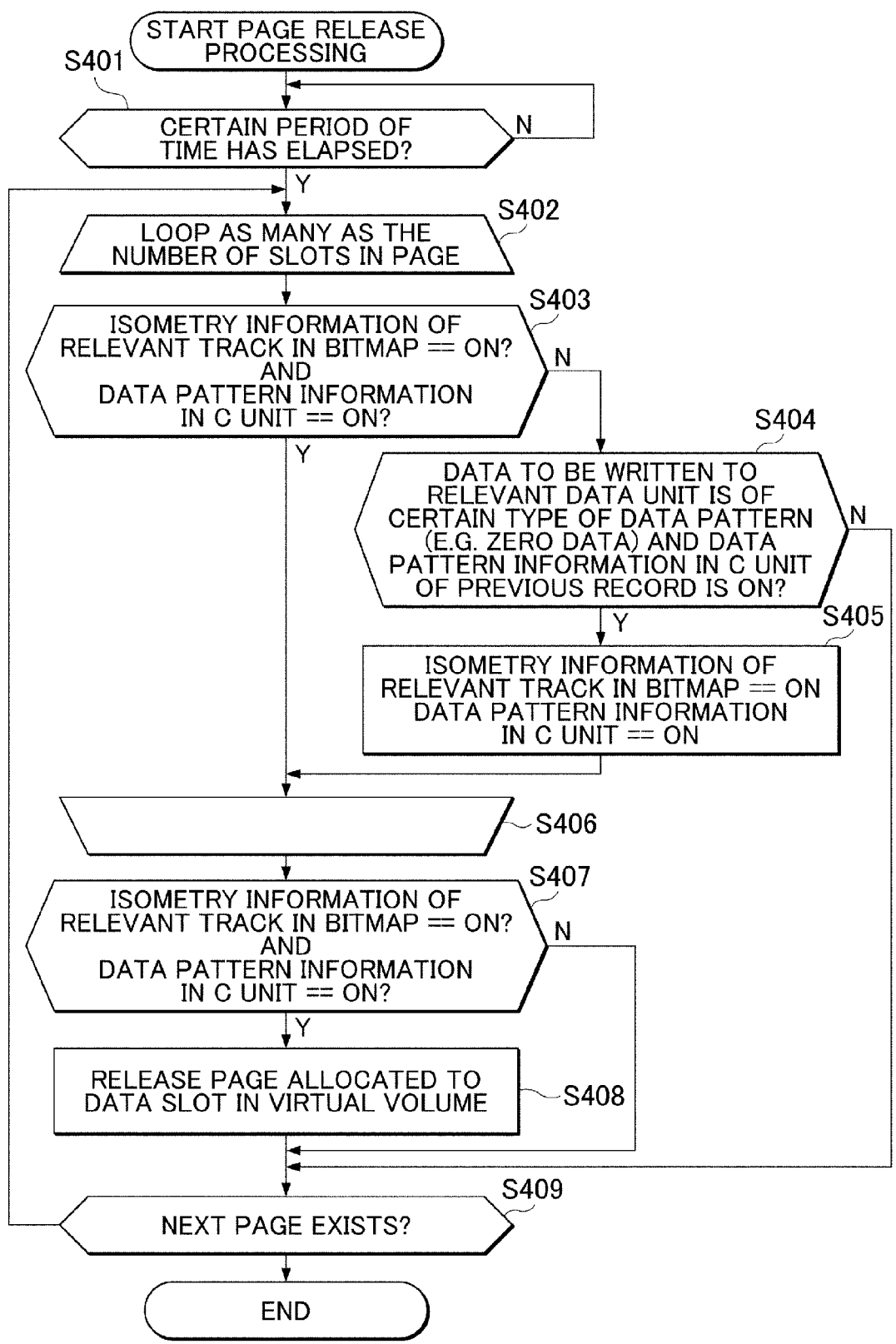
FIG. 12 is a flowchart showing a processing procedure of page release processing according to the embodiment.

As shown in FIG. 12, the data management program 1163 judges whether a specified period of time has elapsed or not (S401). If it is determined in step S401 that a specified period of time has elapsed, the data management program 1163 repeats the processing in steps from S402 to S406 as many times as the number of slots in the page.

The data management program 1163 judges whether or not the isometry information (the same-data flag of the bit b3) of the target track in the bitmap information 1161 is ON and the data pattern information in the count unit (RnC) 511 is ON (S403).

If an affirmative judgment is returned in step S403, the data management program 1163 proceeds to processing in step S406. On the other hand, if a negative judgment is returned in step S403, the data management program 1163 judges whether or not the data to be written to the relevant data unit (RnD) 512 is of a specified data pattern (e.g. zero data) and the data pattern information in the count unit (RnC) 511 of the record immediately before the target record is ON (S404).

Subsequently, in step S404, if the data to be written to the data unit (RnD) 512 is, for example, zero data and the data pattern information in the count unit (RnC) 511 of the previous record is ON, the data management program 1163 turns ON the isometry information (the same-data flag of the bit b3) of the target track in the bitmap information 1161 and turns ON the same data pattern information in the count unit (RnC) 511 (S405).

On the other hand, if a negative judgment is returned in step S404, the data management program 1163 proceeds to processing in step S409.

After repeating the processing in steps from S402 to S406 as many times as the number of slots in the page, the data management program 1163 judges again whether the isometry information (the same data flag of the bit b3) of the target track in the bitmap information 1161 is ON and the data pattern information in the count unit (RnC) is ON or not (S407). Then, if an affirmative judgment is returned in step S407, the data management program 1163 releases the page in the pool volume 122 allocated to the data slot in the virtual volume 125 (S408). On the other hand, if a negative judgment is returned in step S407, the data management program 1163 proceeds to processing in step S409.

Subsequently, the data management program 1163 judges whether a page to be the next execution target of the page release processing exists or not (S409). If no next execution target page exists, the data management program 1163 terminates the processing; and if the next execution target page exists, the data management program 1163 repeats the processing in step S402 and subsequent steps.

(4-4) Read Processing

Next, the data read processing executed by the data management program 1163 in the storage apparatus 10 will be explained. The data read processing is executed in response to read requests from the host 20.

As shown in FIG. 13, the data management program 1163 judges whether a page in the pool volume 122 has already been allocated to the data slot in the virtual volume 125 or not (S501). If it is determined in step S501 that a page in the pool volume 122 has already been allocated to the data slot in the virtual volume 125, the data management program 1163 reads data specified by the host 20 from the pool volume 122 (S502) and terminates the processing (S502).

On the other hand, if it is determined in step S501 that no page in the pool volume 122 is allocated to the data slot in the virtual volume 125, the data management program 1163 judges whether a page in the pool volume 122 has already been allocated to the bitmap slot 52 in the virtual volume 125 or not (S503). If it is determined in step S503 that no page is allocated to the bitmap slot 52 in the virtual volume 125, the data management program 1163 transmits an NOREC report to the host 20 (S506) and terminates the processing with an error.

Next, if it is determined in step S503 that a page is allocated to the bitmap slot 52 in the virtual volume 125, the data management program 1163 judges whether the no-record bit (the bit b1) in the bitmap information 1161 is ON or not (S504). If it is determined in step S504 that the no-record bit is ON, the data management program 1163 transmits an NOREC report to the host 20 (S506) and terminates the processing with an error.

If it is determined in step S504 that the no-record bit is not ON, the data management program 1163 judges whether or not the same-data bit (the bit b3) in the bitmap information 1161 is ON and the isometry information in the count unit (RnC) 511 is ON (S505). If a negative judgment is returned in step S505, the data management program 1163 transmits an NOREC report to the host 20 (S506) and terminates the processing with an error.

If an affirmative judgment is returned in step S505, the data management program 1163 judges the read command from the host 20 (S507).

If it is determined as the judgment result of step S507 that the relevant command is a command which requests transfer of the count unit (RnC) 511, the data management program 1163 creates a count unit of the read target data set (S508).

Furthermore, if it is determined as the judgment result of step S507 that the relevant command is a command which requests transfer of the data unit (RnD) 512, the data management program 1163 creates a data unit (RnD) 512 of the read target data set from the data pattern (S509). At this point, the data pattern of the data unit (RnD) 512 is the data pattern stored in the 10-th and 11-th bytes in the bitmap information 1161.

Furthermore, if it is determined as the judgment result of step S507 that the relevant command is a command which requests transfer of the count unit (RnC) 511 and the data unit (RnD) 512, the data management program 1163 creates a count unit of the read target data set (S511) and creates a data unit (RnD) 512 from the data pattern (S512). Subsequently, the data management program 1163 creates transfer data by combining the count unit (RnC) 511 created in step S511 and the data unit (RnD) 512 created in step S512 (S513).

Next, the data management program 1163 reads the data created in step S508, step S509, or step S513 (S514), and terminates the processing.

(5) Effect of This Embodiment

If the host 20 makes a request to write data including control information to the virtual volume 125 and the write target data is specified data, the storage area allocated to the virtual volume 125 can be released efficiently according to this embodiment as described above. As a result, the resources in the storage apparatus 10 can be effectively utilized without recording invalid data, which is not accessed by the host 20, in the pool volume 122.

Industrial Applicability

The present invention can be applied to a wide range of storage apparatuses for providing storage areas to mainframe host computers.

REFERENCE SIGN LIST

10 Storage apparatus
20 Host
30 Switch
40 Tape management device
110 Storage control unit
111 Channel controller
112 Microprocessor
113 Cache memory
114 Connection unit
115 Shared memory
116 Management information
117 Disk controller
118 Microprocessor
120 Storage unit
121 Storage device
122 Pool volume
125 Virtual volume
1161 Bitmap information
1162 Mapping table
1163 Data management program

The invention claimed is:

1. A storage apparatus connected to a host requesting data writing, the storage apparatus comprising:
one or more storage devices; and
a controller configured to allocate a storage area in a page unit to an area of a virtual volume to write the data in response to a request from the host to write the data;
wherein when the data, regarding which the host makes the write request include control information and the data excluding the control information are specified data, the controller is configured to release allocation of the page allocated to the area for writing the data;
wherein the data are configured from a plurality of data sets, each comprising data units and the control information regarding counter units;
wherein the control information comprises data pattern information that indicates whether data in a sub block of a relevant data set have the same data pattern as the data in the sub block of a data set immediately before the relevant data set; and
wherein the controller is configured to release allocation, when in a target data set the data excluding the control information are the specified data and the data pattern information included in the control information in the data set immediately before the target data set is ON.

2. The storage apparatus according to claim 1, wherein when the data excluding the control information are data of a specified pattern and the length of the data excluding the control information is a constant value, the controller is configured to release allocation of the page allocated to the area for writing the data.

3. The storage apparatus according to claim 2, wherein when the specified pattern is zero data, the data excluding the control information are the zero data, and the length of the data excluding the control information is the constant value, the controller is configured to release allocation of the page allocated to the area for writing the data.

4. The storage apparatus according to claim 1, wherein when the data excluding the control information are not the specified data, the controller is configured to allocate the page to the area for writing the data.

5. The storage apparatus according to claim 1, wherein when the host makes a format write request to the virtual volume, the controller is configured to generate bitmap information about a format of the virtual volume and to set information about the specified data for releasing allocation of the page to the bitmap information.

6. The storage apparatus according to claim 5, wherein the controller is configured to set information indicating the specified pattern of the data excluding the control information and a data length of the data excluding the control information, as the information about the specified data, to the bitmap information.

7. The storage apparatus according to claim 5, wherein when the content of the specified data of the bitmap information corresponds with the content of the data excluding the control information, the controller is configured to release allocation of the page allocated to the area for writing the data.

8. The storage apparatus according to claim 5, wherein when the host makes a request to read the data from a specified area of the virtual volume from which the page is released, the controller is configured to create data in response to the read request based on the information about the specified data of the bitmap information.

9. The storage apparatus according to claim 1, wherein the host is a mainframe host and the controller is configured to format the virtual volume into a mainframe volume.

10. A data management method for a storage apparatus that is connected to a host requesting data writing and has one or more storage devices and a controller configured to control writing of the data,
the data management method comprising:
allocating, using the controller, a storage area in a page unit to an area of a virtual volume to write the data in response to a request from the host to write the data;
judging whether the data regarding which the host makes the write request includes control information, and whether data excluding the control information are specified data;
releasing, using the controller, allocation of the page allocated to the area for writing the data when it is judged that the data excluding the control information are the specified data;
configuring the data from a plurality of data sets, each comprising data units and the control information regarding counter units; wherein the control information comprises data pattern information that indicates whether data in a sub block of a relevant data set have the same data pattern as the data in the sub block of a data set immediately before the relevant data set; and releasing, using the controller, allocation, when in a target data set the data excluding the control information are the specified data and the data pattern information included in the control information in the data set immediately before the target data set is ON.

* * * * *